Figure 1:
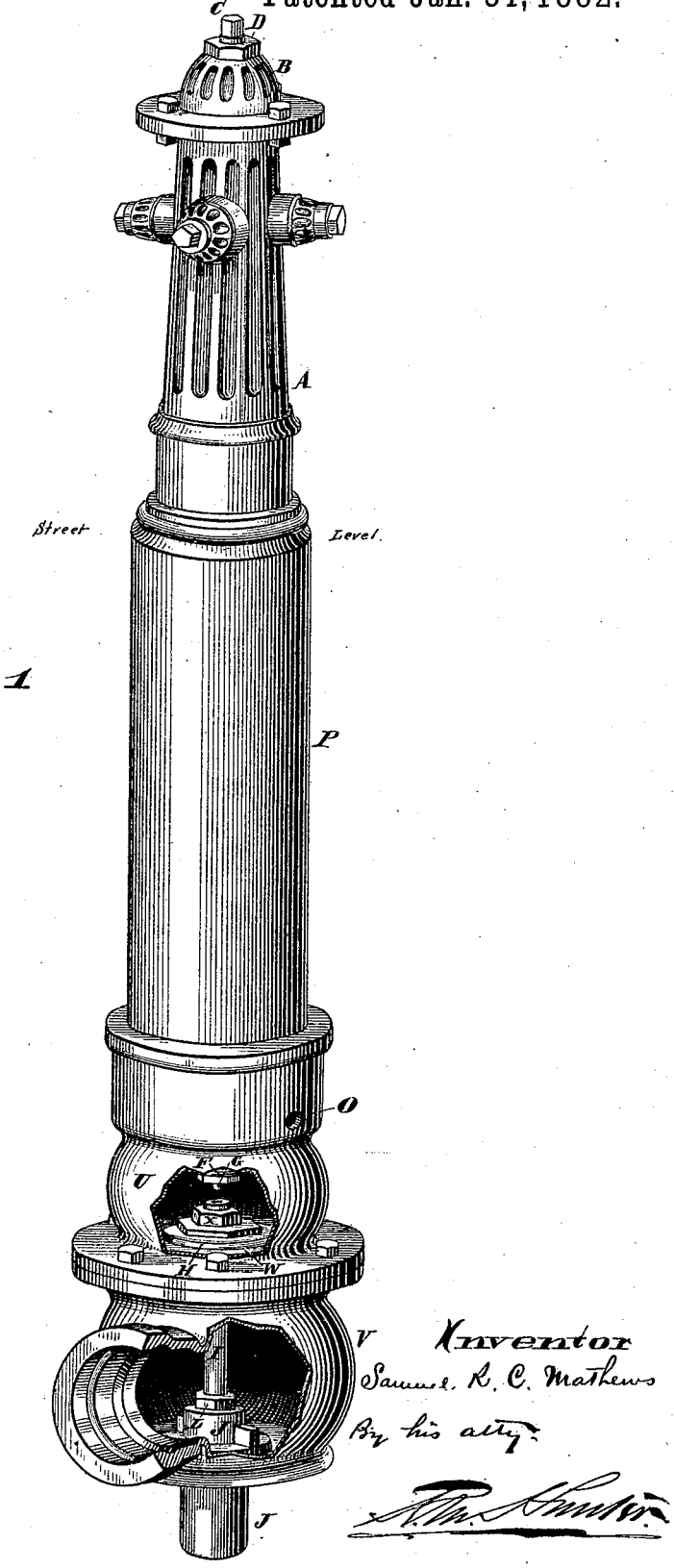

(No Model.) 2 Sheets—Sheet 2.
S. R. C. MATHEWS.
HYDRANT.
No. 252,888. Patented Jan. 31, 1882.
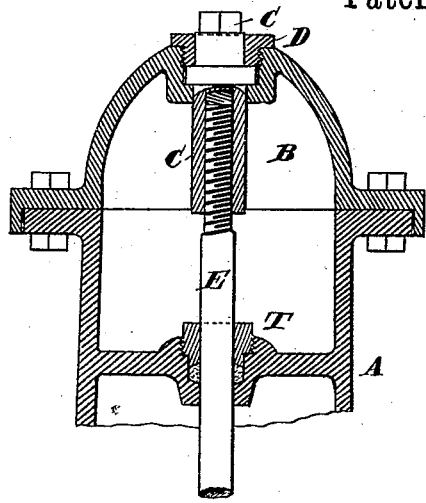
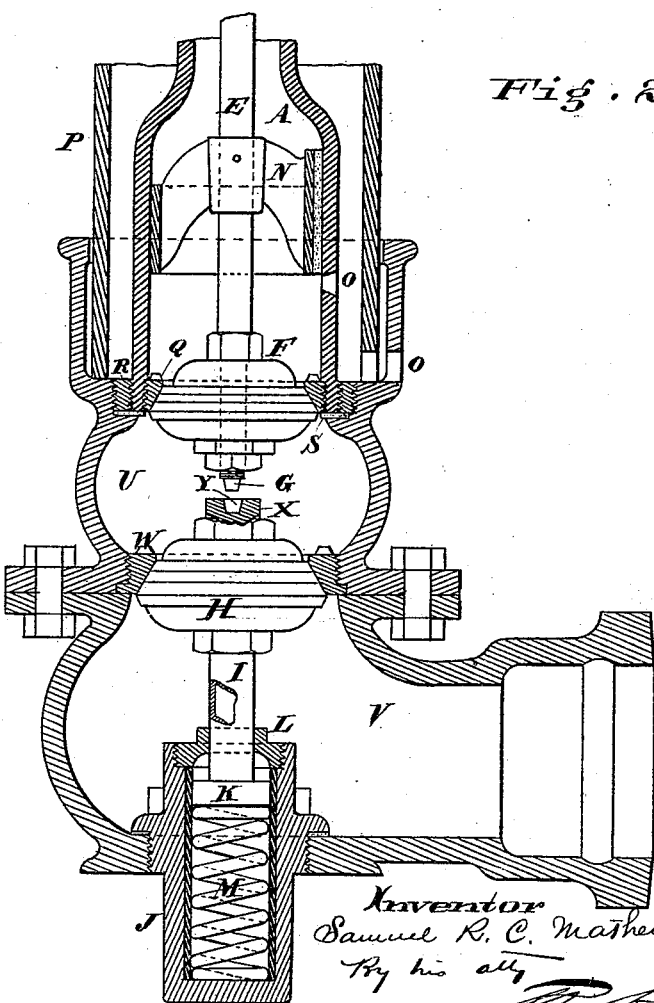
Fig. 2
Attests
Inventor
Samuel R. C. Mathews
By his atty

UNITED STATES PATENT OFFICE.

SAMUEL R. C. MATHEWS, OF PHILADELPHIA, PENNSYLVANIA.

HYDRANT.

SPECIFICATION forming part of Letters Patent No. 252,888, dated January 31, 1882.

Application filed December 8, 1880. (No model.)

*To all whom it may concern:*

Be it known that I, SAMUEL R. C. MATHEWS, of the city of Philadelphia, county of Philadelphia, and State of Pennsylvania, have invented an Improvement in Hydrants, of which the following is a specification.

My invention relates to hydrants in general, but more particularly to that class known as "fire-plugs" or "fire-hydrants;" and it consists in the combination of a main valve, a supplemental valve, a waste-valve, and a stock or barrel with various improvements, which are fully set out in the following specification. If the hydrants are not supplied with auxiliary or supplemental valves, the removal of a single hydrant from the main would necessitate the shutting off of all the water from the mains in the entire district by closing the stop-gate. The great importance of some such provision is evident when but few stop-gates are put in the mains, thereby making the districts so large that to shut off all the water, even for a short period of time, causes much inconvenience and annoyance, and in many instances—such as manufactories where steam-power is used—liability to accident occurs for want of water to supply the boilers. There is also considerable danger from the occurrence of fire in the district in which the water is shut off. Much labor and loss of time are also involved in closing the stop-gates of a district when it is desired to remove a faulty hydrant, and in many instances, particularly when gates of imperfect construction have been used, it is almost, if not quite, impossible to entirely shut off the water, and the gates frequently get out of order, and the spindles are broken or twisted in the attempt to close them. It also not unfrequently happens that the hydrant is located in a low part of a large district, and in such case it is often necessary to bail out water for hours after removing the hydrant, since most or all of the water in the district or section of pipe-distribution passes out of the opening to the main produced by such removal.

The object of my invention is to surmount or overcome all the objectionable features cited above by so constructing the supplemental or auxiliary valve that it shall in reality form a second or duplicate main valve, which shall always be closed when the upper valve is closed, thereby giving great security against leakage; that it shall work automatically—or, in other words, have a positive motion imparted to it in the act of opening and closing the main valve, and close entirely with or before the main valve; that there shall be no loose motion to produce trembling or vibration at times of opening and closing, avoiding the great danger to pipes and joints resulting from these causes; that the supplemental valve and its seats shall be readily accessible should they be injured by any accident and easily repaired or replaced; that said valve shall be so arranged with respect to the main valve and drip that the waste-orifice of the hydrant can be entirely closed before the supplemental valve opens to let on the water, and, reversely, that the supplemental valve can be closed, shutting off the pressure from the main before the waste-orifice is uncovered, and to allow the main valve to be taken out for repairs without impairing the function of the hydrant, and combining such valves with means, such as shown and hereinafter described, by which the above operations may be effected, in addition to attaching or disconnecting the hydrant to or from the water-main without dismantling the top of the hydrant.

In the drawings, Figure 1 is a perspective view of a fire-hydrant embodying in it my improvements. Fig. 2 is a vertical section of same with part of the stand-pipe, valve-rod, and frost-jacket taken away.

A is the stand-pipe, and is made after any suitable design.

B is a cap which is bolted to A, and supports and carries the spindle C, provided with a female screw-thread, which works upon the male thread on the top of the valve-rod E. The spindle C is furnished with a flange, which rests upon a projection from cap B, and is kept in place from vertical movement by a nut, D, and the top is provided with a pentagonal or other suitable head, by which it can be rotated. The valve-rod E is supported laterally and guided vertically by bearing T. Any other desirable mechanism may be used to raise or lower the valve; but I prefer the above.

To the bottom of valve-rod E is secured the main valve F, the bearing-edge of which is made of leather.

To the under side of the valve F, secured in any suitable manner, is a projecting pin, G, the object of which will be hereinafter described.

The main-valve chamber U supports and carries the frost-jacket P, the stand-pipe A, and valve-seat Q.

To the iron chamber U, at the top, is screwed a brass ring, R. Into this ring is screwed the stand-pipe A, which is of cast-iron, and into the bottom of the stand-pipe is screwed the valve-seat Q. The joint is made water-tight by a leather washer, S. The use of brass next to iron always allows the unscrewing of the parts readily, since they cannot rust together. This main-valve chamber U also carries at the bottom a valve-seat, W, of brass, which is screwed in place and is bolted to the elbow V, which forms the base of the hydrant and connects it with the water-mains.

Secured to the bottom of the elbow V is a small brass or brass-lined cylinder, J, in which a piston, K, operating a brass-lined piston-rod, I, works, and which in its downward movement compresses a spring, M, situated within the cylinder and under the piston. The piston is kept in place and protected and the piston-rod guided by the perforated cap L of the cylinder.

To the upper end of the rod I is secured the supplemental or auxiliary valve H, which is preferably of slightly larger diameter than the main valve, and is similar to it in construction. This auxiliary valve H carries, secured to its upper surface, a nut or head, X, provided with a centering-hole, Y, which hole is large enough for the entrance of pin G, attached to the main valve F.

To obtain the best effect from my invention, the valves F and H should be far enough apart that the lower or supplemental valve will close a short period before the upper or main valve reaches its seat, so as to allow the waste-orifice to open or close without unnecessary waste of water. This is effected by lengthening the distance between the pin G and nut X; but it would be within the scope of my invention if both valves closed simultaneously. By the centering-pin G entering the centering-hole Y during the descent of the main valve and before the supplemental valve is depressed from its seat, the two valves are held rigidly in position against lateral movement or vibration.

The lower end of the stand-pipe or hydrant-stock is enlarged to receive the sliding ring or yoke valve N, which covers the waste-orifice O when the hydrant is opened, and is secured to and slides vertically with the valve-rod E. I do not confine myself to its particular construction in this application, as I can use any other suitable construction; but I prefer it to all others.

Having now described the general construction of my invention, I will proceed to set forth its mode of operation.

The spindle C is rotated and the main valve F lowered, during which the tapering or centering pin G of valve F or its rod enters the centering hole or cavity Y in nut X, and after moving sufficient distance to allow the sliding ring-valve N to cover the waste-orifice O the lower or supplemental valve, H, begins to open, through which the water passes into the hydrant from the main. In closing the reverse is the case, the lower or supplemental valve, H, first reaching its seat W and shutting off the flow of water before the waste-orifice is opened, the upper valve, F, still having sufficient motion to allow the slide-valve to uncover waste-orifice O before it reaches its seats Q, so that there is no waste of water from the main during the act of opening and closing the hydrant, or when the main and supplemental valves are open but a little way, as is usual in filling street-watering carts, flushing gutters, &c.

In taking out the hydrant for repairs it is only necessary to unscrew the stock A from the chamber U and elbow V, leaving the frost case or jacket P, chamber U, elbow V, supplemental valve H, and its raising mechanism in the ground, the action of the supplemental valve being absolutely automatic and requiring no separate manipulation. The brass coil-spring M in cylinder J insures the raising of the supplemental valve H to its seat in closing the hydrant. From this it is seen that the supplemental valve is always closed when the main valve is closed, and, being a perfectly-constructed valve with heavy brass seat, I obtain double security against leakage from any cause; yet while operated by a positive downward motion of the valve-rod E, the main and supplemental valves still act independently of each other, so that any obstruction which may become lodged in the lower valve, thus preventing its closing, the main or upper valve could be brought home to its seat without difficulty, thus insuring the shutting off of the water from the hydrant. I thus get the greatest security that it is possible to obtain against leakage, which so frequently proves disastrous in the hydrants now used in our northern cities, causing much damage and breakage by freezing and rendering the hydrants useless in time of fires.

The importance of closing the waste-orifice before any waste from the main is let into the hydrant cannot be too highly commented on, since in most if not all hydrants heretofore constructed, the waste-orifice and the main valve would be open for a short period of time during the opening and closing of the valve, and when the main valve is only slightly opened the orifice is open all the time. By this there was great waste of water from the hydrant by direct pressure from the mains, the result being to saturate the ground around the hydrant, the waste frequently showing itself above the surface and preventing the rapid absorption of waste water from the hydrant by the ground, which is so necessary after using in extreme cold weather, causing water to remain in the stand-pipe of hydrant until frozen.

If the upper or main valve becomes out of order, it can be removed from the valve-rod without in any way interfering with the working of the supplemental valve, which will now perform the function of the main valve, and the hydrant can be used continually.

Having now described my invention, what I claim as new, and desire to secure by Letters Patent, is—

1. A completed hydrant which consists of the following parts in combination: the chambers V and U, supplemental valve H, piston-rod I, cap L, spring-chamber J, spring M, valve-rod E, provided on the top with a screw-thread, ring-valve N, stock A, provided with waste-orifice O and stuffing-box T, cap B, sleeve C, and retaining-cap D, all constructed substantially as and for the purpose specified.

2. In a hydrant, the combination of the chambers V and U, valve H, rod I, and spring M with seat W, valve F, seat Q, stock A, and brass ring R, substantially as and for the purpose specified.

3. In a hydrant, the combination of chambers V and U, valves H and F, and their seats with rod I, spring M, nut X, with its recess or centering-hole Y, pin G on valve F, a waste-valve, stock A, with waste-orifice O and stuffing-box T, cap B, sleeve C, and frost-jacket P.

4. The supplemental valve H, in combination with rod I, working in a cylinder, J, entirely closed at the top and inclosing the spring M, for the purpose of closing the supplemental valve against its seat and protecting the spring and point of contact with the rod, substantially as shown and described.

In testimony of which invention I hereunto set my hand.

SAMUEL R. C. MATHEWS.

Witnesses:
ROBT. A. CAVIN,
SAMUEL E. CAVIN.